United States Patent
Tamaki et al.

(10) Patent No.: US 8,118,966 B2
(45) Date of Patent: Feb. 21, 2012

(54) METHOD FOR PRODUCING JOINED BELT

(75) Inventors: Yoshiro Tamaki, Yamatokoriyama (JP); Akimitsu Tsuji, Yamatokoriyama (JP); Yoshihiro Konishi, Yamatokoriyama (JP); Takashi Yamamoto, Yamatokoriyama (JP); Norio Shirai, Yamatokoriyama (JP); Yasuaki Taniguchi, Yamatokoriyama (JP); Tetsuro Fujima, Yamatokoriyama (JP); Koji Uchida, Yamatokoriyama (JP)

(73) Assignee: Nitta Corporation, Osaka (JP)

( * ) Notice: Subject to any disclaimer, the term of this patent is extended or adjusted under 35 U.S.C. 154(b) by 143 days.

(21) Appl. No.: 12/441,715

(22) PCT Filed: Apr. 24, 2008

(86) PCT No.: PCT/JP2008/058314
§ 371 (c)(1),
(2), (4) Date: Mar. 17, 2009

(87) PCT Pub. No.: WO2008/136493
PCT Pub. Date: Nov. 13, 2008

(65) Prior Publication Data
US 2010/0021729 A1 Jan. 28, 2010

(30) Foreign Application Priority Data
May 1, 2007 (JP) .................................. 2007-120784

(51) Int. Cl.
*B65H 69/06* (2006.01)
(52) U.S. Cl. ............... 156/304.5; 156/304.1; 156/304.6; 156/502
(58) Field of Classification Search ................. 156/304.5
See application file for complete search history.

(56) References Cited

U.S. PATENT DOCUMENTS

| 3,774,898 A | * | 11/1973 | O'Neil et al. ................. 269/45 |
| 2002/0170667 A1 | * | 11/2002 | Schlueter et al. .......... 156/304.5 |
| 2006/0030444 A1 | | 2/2006 | Barrett |
| 2008/0190745 A1 | | 8/2008 | Taniguchi et al. |

FOREIGN PATENT DOCUMENTS

| DE | 3933710 A1 | 4/1990 |
| JP | H05-26350 | 4/1993 |
| JP | 5-254022 A | 10/1993 |
| WO | WO 2006/022332 A1 | 3/2006 |

OTHER PUBLICATIONS

Extended European Search Report for corresponding EP Application No. 08752254.6-1252, Apr. 4, 2011.

* cited by examiner

*Primary Examiner* — Mark A Osele
(74) *Attorney, Agent, or Firm* — Ditthavong Mori & Steiner, P.C.

(57) ABSTRACT

A flat belt 20 is prepared. A first belt end 21 of the belt 20 has a finger shape and a second belt end 22 of the belt 20 has the complimentary shape to the first belt end 21. An adhesive is applied to one of an end face 21K of the first belt end 21 and an end face 22K of the second belt end 22 or to both. Next, both end faces 21K and 22K are butted. The butted portion B of the first and second belt ends 21 and 22 are pressed in the belt width direction. Due to this, the end faces 21K and 22K are bonded by the adhesive so that the first and second belt ends 21 and 22 become joined.

20 Claims, 8 Drawing Sheets

METHOD FOR PRODUCING JOINED BELT

TECHNICAL FIELD

The present invention relates to a method for producing a joined belt, and in particular an endless belt, by joining a first belt end to a second belt end.

BACKGROUND ART

A flat belt for transmission or transportation is normally used in the endless form which is made by joining both ends of the flat belt. The finger joint is a well-known method for joining both belt ends. In this method, several tongues are formed on one belt end in a sawtoothed or finger shape, and several notches are formed in the other belt end so that it is in a complementary shape with the first end, and then both ends are butted by inserting each tongue into each notch. The flat belt has a thermoplastic resin layer. Thus, both butted ends are heated and bonded by the fusion of the thermoplastic resin so that an endless belt is produced.

International Publication NO. 06/022332 discloses a method for joining the belt ends using a presetter, which has a lower mold portion with an L-shaped cross-section and a movable member provided on the lower mold. The butted portion of the belt is placed on the lower mold and is held by the wall portion of the lower mold and the movable member. While it is held, the butted portion is pressed in the belt thickness direction and is heated. Due to the pressure and heat, the thermoplastic resin of the belt fuses and flows out between both butted belt ends, so that both belt ends are fusion-bonded by the fused resin.

However, when both belt ends are joined by the method above, part of the thermoplastic resin is likely to flow out from the butted portion. The flowing resin forms "flash", which compromises the flatness of the belt. In addition, the physical properties of the belt joint portion which are formed of the fused resin are different from the rest of the belt. For example, when an oriented polyamide film is used as the belt tension member, the orientation of the film is lost by heat and fusion, which causes the modulus of the joint portion to differ from that of the rest of the belt.

Furthermore, the high pressure in the belt thickness direction has to be applied to the butted portion in the above-mentioned method in order to fill the fused resin between both belt ends. Accordingly, the butted portion is plastically deformed by compression and therefore, the butted portion turns out thinner than the rest of the belt.

Incidentally, the document mentioned above discloses that the belt is held in the belt width direction by the movable member and the wall portion in order to keep the butted portion at a predetermined position. However, it does not disclose that the butted portion is pressed in the belt width direction in order to join both belt ends with the adhesive.

DISCLOSURE OF INVENTION

An object of the present invention is to provide a method for producing a joined belt, in which both belt ends are joined with high bond strength, using neither a fusion bond nor applying high pressure in the belt thickness direction.

The inventive method is for producing a joined belt by joining first and second belt ends. The inventive method comprises the step of applying an adhesive on at least one of a first end face of the first belt end and a second end face of the second belt end. At least a part of the first end face is diagonal to the belt width direction, or perpendicular to the belt width direction. Furthermore, the second belt end has a shape complementary to the first belt end. The inventive method further comprises the step of butting the first end face to a second end face, and the step of bonding the first and second end faces through the adhesive by pressing the butted portion of the first and second belt ends in the belt width direction so that the first and second belt ends are joined.

DESCRIPTION OF THE PREFERRED EMBODIMENTS

Figure 1:
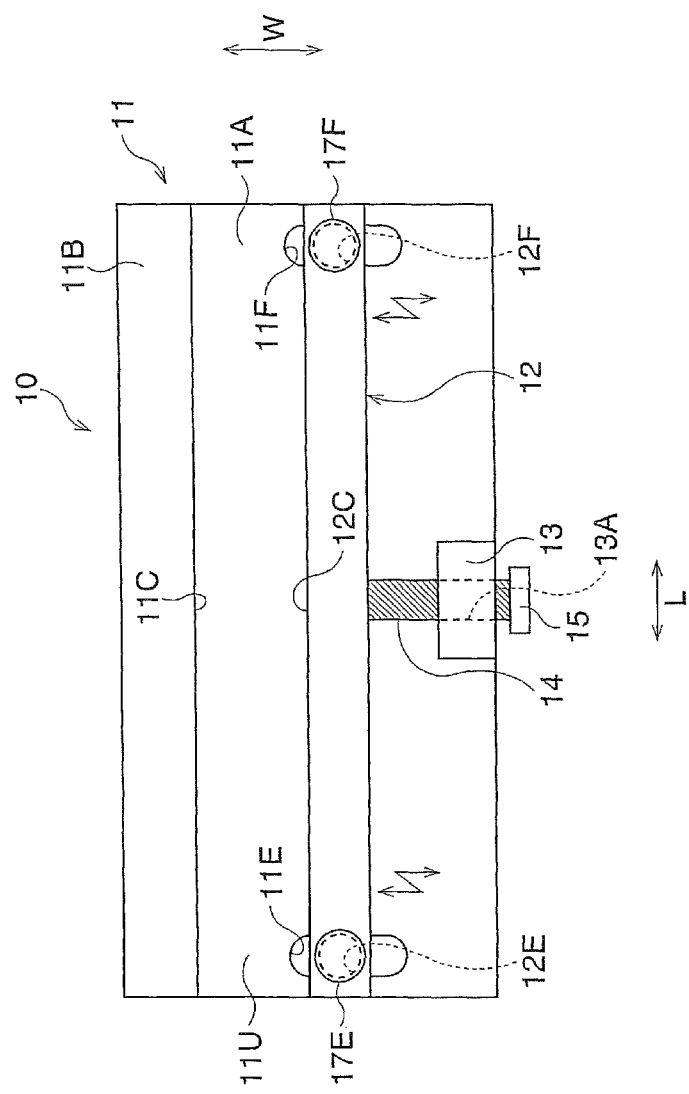
FIG. 1 is a plan view of a press mold used in the method in the first embodiment, as viewed from above.

The present invention will be described below with reference to the embodiments shown in the drawings.

Figure 2:
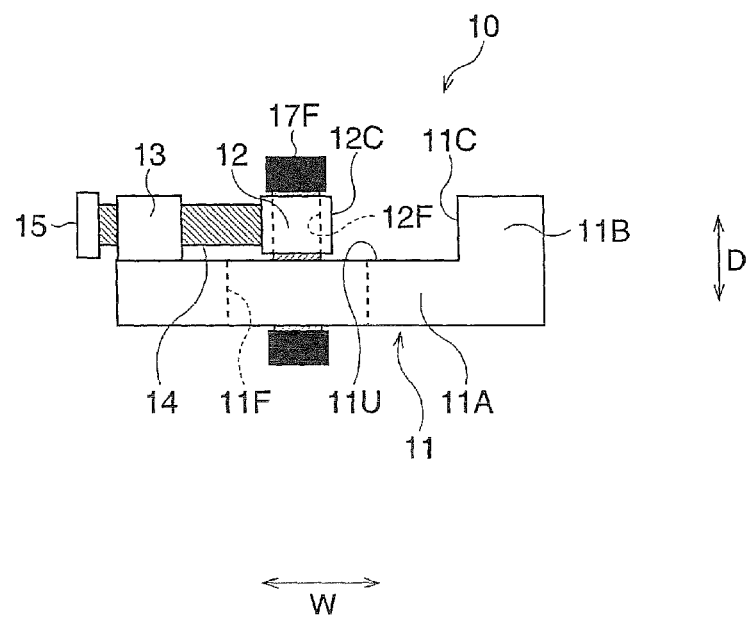
FIG. 2 is a side view of the press mold used in the method in the first embodiment.

FIGS. 1 and 2 show a press mold for joining both ends of a flat belt. First, the structure of the press mold will be explained using FIGS. 1 and 2. The press mold 10 has a lower mold 11, a movable member 12, and a screw supporter 13. The lower mold 11 has an L-shaped cross-section and includes a base portion 11A having a rectangle upper surface 11U, and a side wall portion 11B which is provided on one side of the upper surface 11U. The side wall portion 11B has an inner surface 11C, which is perpendicular to the upper surface 11U.

The movable member 12, which extends in the longitudinal direction L of the upper surface 11U, faces the inner surface 11C of the side wall portion 11B, on the upper surface 11U. A facing surface 12C of the movable member 12 faces the inner surface 11C which is parallel to the facing surface 12C. The base portion 11A has guide portions (guide holes) 11E and 11F which extend in the width direction W of the upper surface 11U. The guide holes 11E and 11F, which penetrate in the thickness direction D of the base portion 11A (namely, the up-down direction), are located at both ends of the base portion 11A in the longitudinal direction L.

The movable member 12 has holes 12E and 12F which penetrate in the thickness direction D and which are located at either end of the movable member 12 in the longitudinal direction L. The holes 12E and 12F overlap the guide holes 11E and 11F, respectively, and screws 17E and 17F are inserted through the overlapping holes 11E and 12E and the overlapping holes 11F and 12F, respectively. The movable member 12 is movably held by the base portion 11A through the screws 17E and 17F so that the movable member 12 can move in the width direction W. While the movable member 12 moves, the screws 17E and 17F are guided by the guide holes 11E and 11F, respectively.

The screw supporter 13 is provided on the other end of the upper surface 11U. The screw supporter 13 is perforated in the width direction W so as to form a screw hole 13A which is provided with a thread groove on its inner surface, and a screw 14 is inserted in the screw hole 13A. One end of the screw 14 is connected to the movable member 12, and a flange 15 is provided on the other end of the screw 14 for easy handling. The movable member 12 moves together with the screw 14 in the width direction W relative to the screw supporter 13—namely, the base portion 11A—by tightening or loosing the screw 14.

Figure 3:
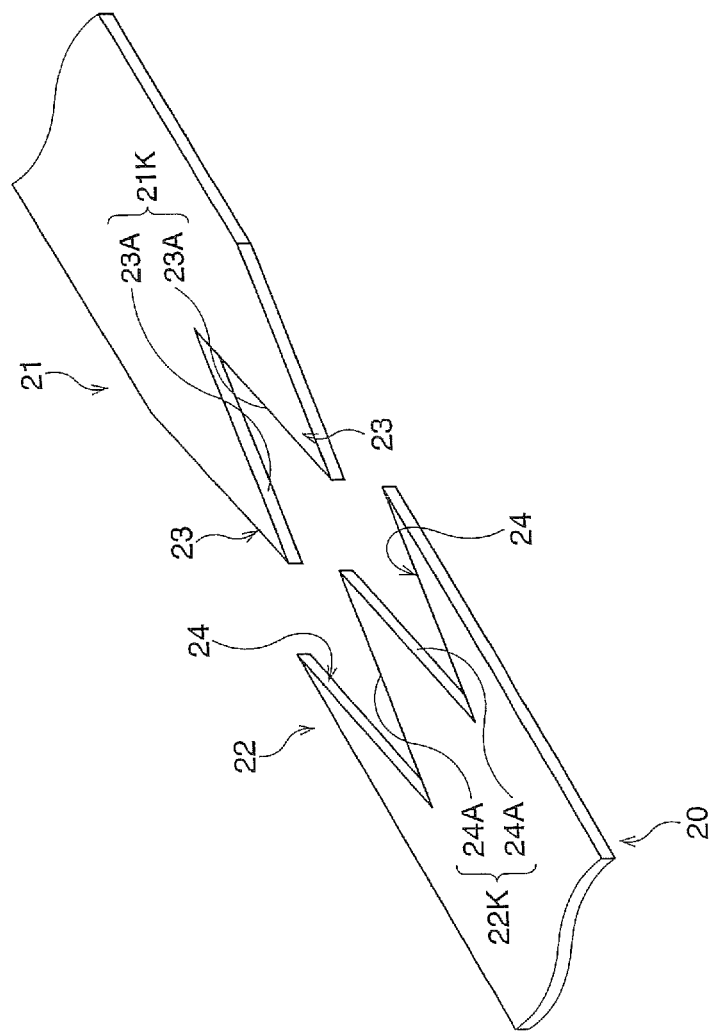
FIG. 3 is a perspective view of both ends of the belt.

FIG. 3 shows both ends of a flat belt 20, which are to be joined in the joining process as described below. Next, the structure of both ends of the belt 20 will be explained using FIG. 3. The thickness of the belt 20 is less than the width of the belt 20. The belt 20 is not limited to the structures described below but has a tension member composed of a resin sheet such as a polyamide sheet or a fabric, and one or more fabrics, a resin layer, a rubber layer, or a combination thereof laminated on one or both surfaces of the tension member, for example. Alternatively, the belt 20 may consist of the tension member as described above, or one or more rubber layers.

Figure 4:
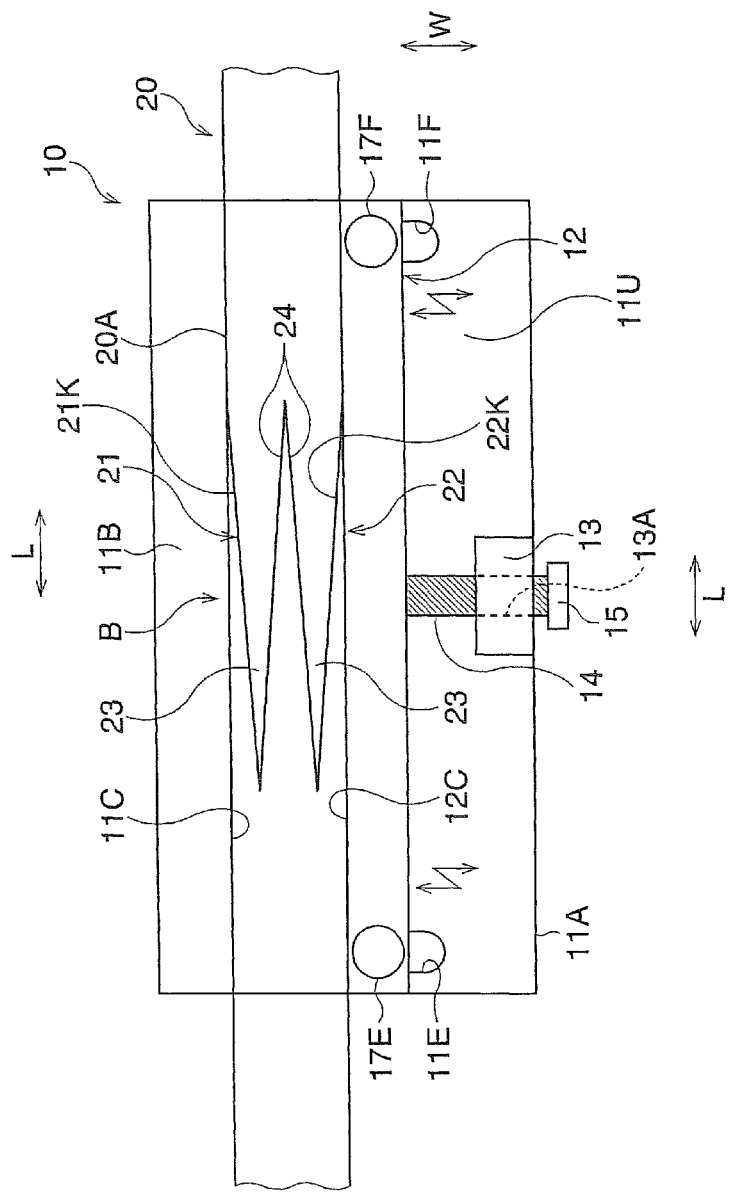
FIG. 4 is a plan view of a press mold on which the belt is placed, as viewed from above.

As shown in FIG. 3, one belt end (a first belt end 21) of the belt 20 in the belt longitudinal direction is provided with a plurality of tongues 23 (two tongues in this embodiment) which project in the belt longitudinal direction. Each tongue 23 has the same thickness as that of the other portion of the belt 20 and has an isosceles triangle shape, as viewed from above, as shown in FIG. 4. The tongues 23 align in the belt width direction and each tongue 23 connects with the other adjoined tongue 23 in series such that the first belt end 21 is formed into a saw-toothed shape or a finger shape. Outer surface 23A of the tongues 23, which are diagonal to the belt width direction, constitute an end face (first end face 21K) of the first belt end 21.

The other belt end (a second belt end 22) of the belt 20 in the belt longitudinal direction is provided with a plurality of notches 24, which penetrate the belt in the belt thickness direction. Inner surfaces 24A of the notches 24 constitute an end face (second end face 22K) of the second belt end 22. Each notch 24 has same outline as that of the tongues 23 and each notch 24 connects the adjoined notch 24 in series. Thus, the second belt end 22 has a complementary shape to the first belt end 21, and has a saw-toothed shape or a finger shape. Therefore, the first end face 21K can be butted to a second end face 22K when each tongue 23 is inserted into each notch 24. The first and second belt ends 21 and 22 are produced by cutting with a well-known apparatus. The first and second end faces 21K and 22K are preferably parallel to the belt thickness direction, but are not limited to this design.

The length of the tongues 23 in the belt longitudinal direction is greater than the width in the belt width direction in this embodiment, and accordingly, the area of the outer surface 23A of the tongue 23 (or the inner surface 24A of the notch 24), namely the butted area, can become large. Because the tongue 23 is shaped into an isosceles triangle, the outer surface 23A of the tongue 23 consists of two diagonal surfaces which are diagonal at the same angle with respect to the belt width direction. Therefore, all the area of the outer surface 23A is biased toward the inner surface 24A equally by a pressure in the width direction as described below, which produces a stable joint. Furthermore, because each tongue 23 connects the other adjoined tongue 23 in series, the whole first end face 21K is diagonal to the belt width direction. Therefore, the first end face 21K is easily biased towards the second end face 22K by the width direction pressure.

Next, the process for producing the endless belt is explained using FIGS. 3 and 4. At first, an adhesive is applied to the butted face, namely, one of the first and second end faces 21K and 22K, or both. Next, the first and second end faces 21K and 22K are butted by inserting each tongue 23 into each notch 24. A butted portion B of the first and second belt ends 21 and 22 is placed on the upper surface 11U of the base portion 11A between the wall portion 11B and movable member 12, while the belt longitudinal direction is parallel to the longitudinal direction L and the side surface 20A of the belt 20 contacts the inner surface 11C of the wall portion 11B. At this time, the movable member 12 is advanced so that the belt 20 can be inserted between the wall portion 11B and movable member 12. As for the above-mentioned adhesive, polyamide adhesive (for example, Polybond A (brandname), manufactured by Nitta. Corp.), or urethane adhesive can be used, Next, the movable member 12 is moved by tightening the screw 14 so that the facing surface 12C approaches the wall portion 11C. Then the butted portion B is held by the facing surface 12C of the movable member 12 and the inner surface 11C of the wall portion 11B. While being held, the screw 14 is further tightened so that the butted portion B is pinched and pressed in the belt width direction by the movable member 12 and the wall portion 11B. The pressure in the belt width direction continues to be applied until the adhesive is cured or solidified. The butted end faces (first and second end faces 21K and 22K) are bonded by the cured or solidified adhesive. Due to this bonding, both belt ends 21 and 22 are joined and the endless belt is obtained.

In this embodiment, both belt ends 21 and 22 are joined without pressure in the belt thickness direction, which prevents the joined portion from getting thinner than the rest of the belt 20. Furthermore, because both belt ends 21 and 22 are bonding without fusion, it is not necessary for the belt 20 to have the thermoplastic resin layer. Additionally, the belt ends 21 and 22 can be joined without the change in physical properties resulting from fusion, even if the belt 20 has a thermoplastic resin layer. Namely, the physical properties of the joined portion will be same as that of the rest of the belt 20. Furthermore, due to the fusion-less bonding, no flash is formed.

Figure 5:
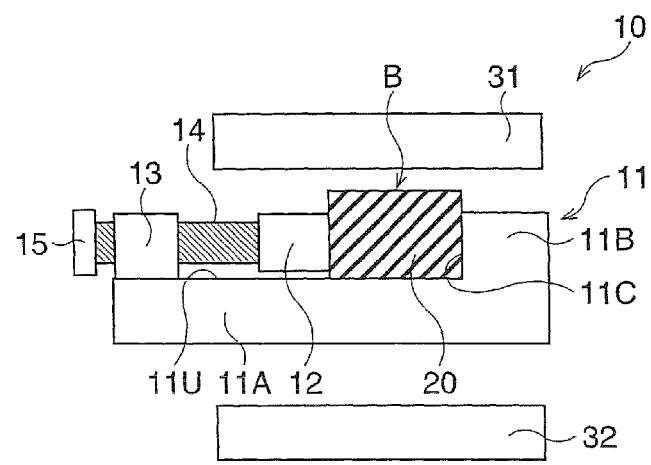
FIG. 5 is a side view of the press mold in the second embodiment.

FIG. 5 is a side view of the press mold in the second embodiment. Next, the press mold in this embodiment will be explained using FIG. 5. The press mold 10 in this embodiment has first and second heat plates 31 and 32 which are disposed above and below the lower mold 11, respectively. Thus, the belt 20 which is placed on the upper surface 11U is interposed between the plates 31 and 32. The first and second heat plates 31 and 32 are a well-known heater for heating the belt 20, such as a metal plate heated by an electrically-heated wire or by a heating medium such as liquid or gas. The first heat plate 31, which is movable up and down relative to the base portion 11A, can contact the top surface of the belt 20 and can press the belt 20 from above.

In this embodiment, the butted portion B is sandwiched and pressed in the belt thickness direction by the first heat plate 31 and the base 11A, while it is pressed in the belt width direction. The tongue 23 could separate from the inside of the notch 24 by pressure in the belt width direction, but this separation is restrained by the pressure in the belt thickness direction.

Preferably, the first heat plate 31 presses the butted portion B with light pressure so that the butted portion B is not plastically deformed by compression. Alternatively, the first heat plate 31 does not press the butted portion B in the belt thickness direction but only contacts the top surface of the butted portion B.

When the first and second ends 21 and 22 are joined, the butted portion B may be heated from above and below across the belt thickness direction by the first and second heat plates 31 and 32 while it is pressed in the belt width direction. In this case, the butted portion may or may not be pressed in the thickness direction by the plates 31 and 32 while it is heated. This heating is useful, for example, when a thermosetting adhesive is used.

When the thickness of the belt 20 is greater than the height of the wall portion 11B, the top surface of the belt 20 is located at a higher position than the top of the wall portion 11B. Accordingly, as shown in FIG. 5, the butted portion B can be sandwiched and pressed by the first heat plate 31 and base portion 11A without obstruction by the wall portion 11B.

Figure 6:
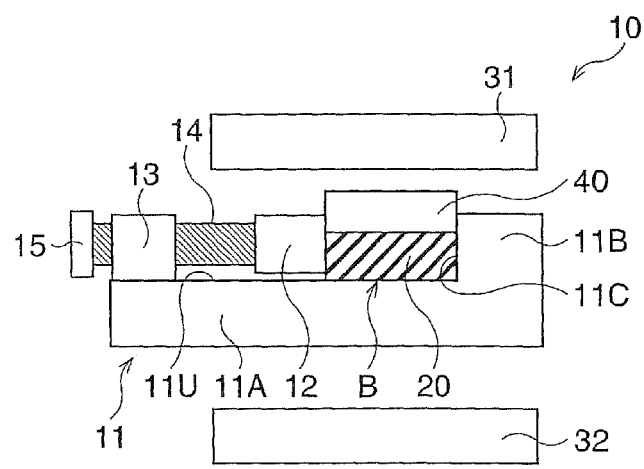
FIG. 6 is a side view of the press mold when a press plate member is used in the second embodiment.
Figure 7:
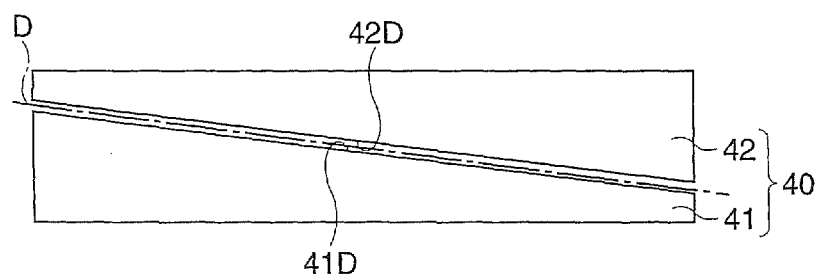
FIG. 7 is a plan view of one embodiment of the press plate member.

On the other hand, when the thickness of the belt 20 is less than the height of the wall portion 11B, the press by the first heat plate 31 may be obstructed by the wall portion 11B. Therefore, in this case, it is preferable that a press plate member 40 be placed on the top surface of the butted portion B and the butted portion B be pressed by the first press plate 31 through the press plate member 40 as shown in FIG. 6.

The press plate member 40 may have a rectangular plate shape, for example. Alternatively, the press plate member 40 may be composed of first and second plate portions 41 and 42 which are trapezoids resulting from dividing a rectangular plate along a dividing line D. The dividing line D extends diagonally from end to end in the longitudinal direction of the rectangular plate. Thus, the first and second plate portions 41 and 42 have diagonal surfaces 41D and 42D along the dividing line D.

By bringing the diagonal surfaces 41D and 42D into contact with each other and by moving first plate portion 41 along the diagonal surface 42D relative to the second plate portion 42, the width of the press plate member 40 can be adjusted so as to match the belt width, so that the belt 20 can be pressed in the belt width direction by the movable member 12 without obstruction by the press plate member 40. Therefore, the press plate member 40 can accommodate the variation in the belt width.

Alternatively, the press plate member 40 is placed on the top surface of the belt 20 but is not pressed by the first heat plate 31. Placing the press plate member 41 on the belt 20 can prevent the tongue 23 from separating from inside the notch 24.

Figure 8:
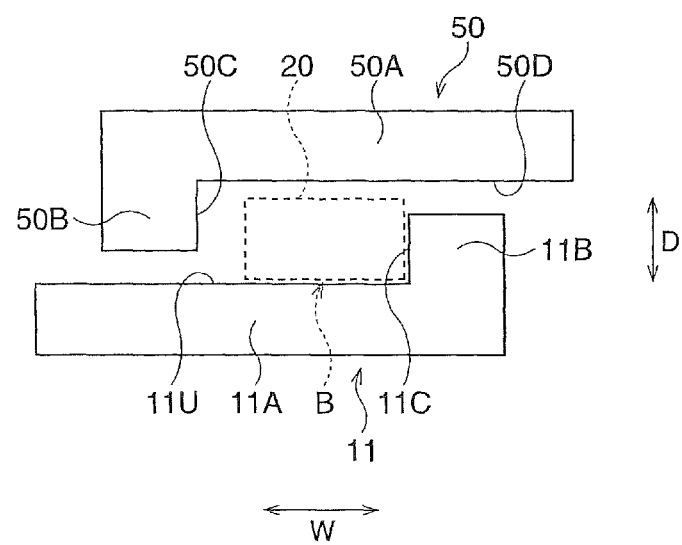
FIG. 8 is a side view of the press mold in the third embodiment.

FIG. 8 is a side view of the press mold in a third embodiment. Next, the difference between the third and first embodiments will be described. In the first embodiment, the movable member is provided on the lower mold 11. However, in this embodiment, the movable member is not provided on the lower mold 11 but on an upper mold 50 which is a body other than the lower mold 11.

In this embodiment, the lower mold 11 has the base 11A and the wall portion 11B which is provided on the right side of the upper surface 11U, similarly to that in the first embodiment. The upper mold 50 has an L-shaped section and includes an upper base portion 50A having a rectangular lower surface 50D, and a wall portion 50B which is provided on the left side of the lower surface 50A.

The upper base portion 50A is disposed above the lower mold 11 such that the lower surface 50D faces the upper surface 11U of the base portion 11A and the bottom of the wall portion 50B is close to the left side of the upper surface 11U. Due to this, above the upper surface 11U, an inner surface 50C of the wall portion 50B faces the inner surface 11C of the wall portion 11B in the width direction W. The upper mold 50 is movable relative to the lower mold 11 in the width direction W.

The butted portion B is placed on the upper surface 11U of the lower mold 11 between the wall portions 11B and 50B. In this embodiment, the upper mold 50, namely, the wall portion 50B (movable portion) is moved to the right (that is, in the width direction W) relative to the lower mold 11 so that the butted portion B is pinched and pressed in the belt width direction by the inner surfaces 11C and 50C. This pressing is continued until the adhesive which is applied on the butted ends is cured or solidified and then both belt ends are joined by the cured or solidified adhesive.

In this embodiment, the upper mold 50 may be movable vertically (namely, in the thickness direction D) relative to the lower mold 11. In this case, the butted portion B can be pressed in the belt thickness direction D by the base portions 11A and 50A while it is pressed in the belt width direction. Of course, the lower surface 50D of the base portion 50A may only contact the top surface of the belt 20 instead of pressing in the belt thickness direction. Furthermore, in this embodiment, the press plate member 40 may be placed on the top surface of the butted portion B, similar to the second embodiment. Furthermore, the upper and lower molds 11 and 50 may function as the heater and the butted portion B may be heated by the molds 11 and 50. Of course, the butted portion B may be heated by a heater other than the molds 11 and 50.

Figure 9:
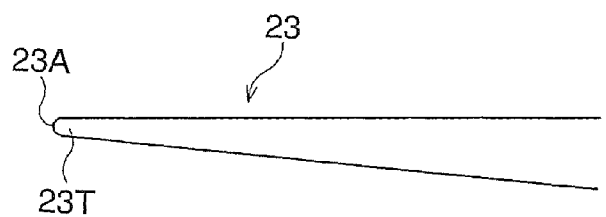
FIG. 9 is a plan view of one embodiment of a tongue.

In the above-mentioned embodiments, the tongue 23 is not limited to the isosceles triangle shape but can be another triangle or another shape in which the width of the tongue 23 diminishes towards the tip of the tongue 23. For example, the tongue 23 may have a right triangle shape in the plan view as viewed from above, so that the outer surface 23A of the tongue 23 (namely the first end face 21K) consists of a surface perpendicular to the belt width direction and a surface diagonal to the belt width direction. Furthermore, as shown in FIG. 9, the tongue 23 may have a shape in which the width of the tongue 23 diminishes towards the tip 23T of the tongue 23 and the outer surface 23A of the tip 23T is a curved surface.

Of course, the first and second belt end faces 21K and 22K may include a surface parallel to the belt width direction, in addition to a surface perpendicular or diagonal to the belt width direction. Namely, in addition to the portions of first end face 21K which are diagonal or perpendicular to the width direction, a portion of the end face 21K may also be parallel to the belt width direction. For example, the tongue 23 may have a rectangular shape which extends in the belt longitudinal direction, in the plan view as viewed from above. In this case, the corners in the tip of the tongue 23 may have a chamfered edge shape or a curved shape.

Figure 10:
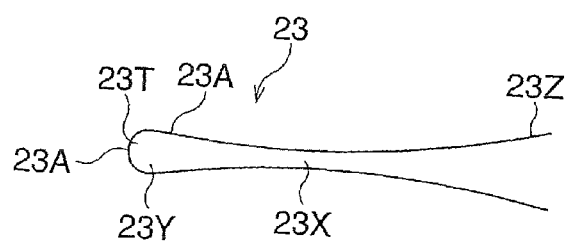
FIG. 10 is a plan view of another embodiment of a tongue.

As shown in FIG. 10, the tongue 23 may have a narrow portion 23X which is relatively narrow portion and a wider portion 23Y which is connected to a tip of the narrow portion 23X. In this case, the width of the tongue 23 diminishes in the outward direction from the base 23Z of tongue 23 so as to form the narrow portion 23X, and the width of the tongue 23 increases outwardly from the narrow portion 23X to the tip 23T so as to form the wider portion 23Y. Then, the tip of the narrow portion 23X becomes the tip 23T of the tongue 23. The outer surface 23A of the tip 23T side of the wider portion 23Y is formed into a curved surface.

According to the tongue 23 in FIG. 10, when the endless belt 20 is pulled in the belt longitudinal direction, the outer surface 23A of the base 23Z side of the wider portion 23Y is engaged with the inner surface 24A of the notch 24. Therefore, the tongue 23 is securely prevented from separating from the inside of the notch 24, and the tensile strength of the belt is improved.

Figure 11:
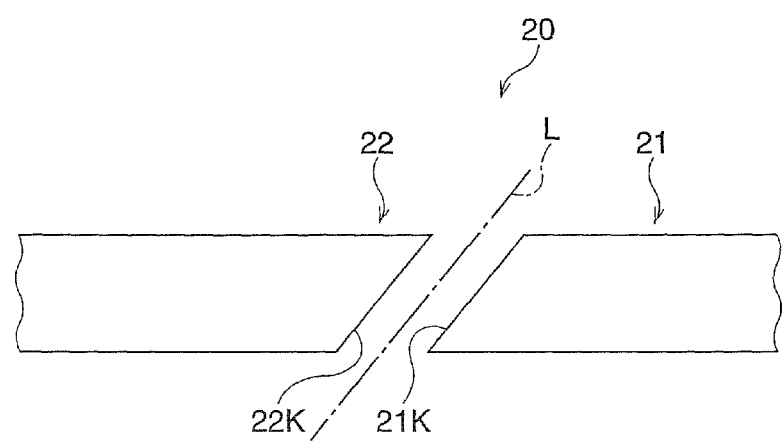
FIG. 11 is a plan view of both ends of the belt in the fourth embodiment.

FIG. 11 is a plan view of the belt 20 in a fourth embodiment. From the first to the third embodiment, tongues 23 and notches 24 are provided on the belt ends 21 and 22. However, in this embodiment, no tongues 23 or notches 24 are provided.

In this embodiment, the belt ends 21 and 22 have an edge shape cut at the same angle along a line L which is diagonal to the belt width direction, as viewed from above. Namely, the first and second end faces 21K and 22K comprise same-angled surfaces which are diagonal to the belt width direction and which are parallel to the belt thickness direction, so that the second belt end 21 has a complimentary shape to the first belt end 21.

In this embodiment, after the adhesive is applied to one or both of end faces 21K and 22K, both end faces 21K and 22K are butted and bonded in the same manner as in from the first through third embodiments.

In this embodiment, because both end faces 21K and 22K are diagonal to the belt width direction, the first end face 21K can be biased toward the second end face 22K by pressure in the belt width direction. Therefore, the both belt ends 21 and 22 are joined strongly, similar to the first embodiment.

In each of the embodiments described above, the flat belt is exemplified as the belt 20, but the belt 20 is not limited to a flat belt and it may be a toothed belt or the like. When the belt 20 is a toothed belt, the upper surface 11U of the base portion 11A is formed into a tooth profile. Furthermore, all the embodiments described above the first and second belt ends 21 and 22 which are joined belong to the same belt 20. However, the second belt end of the first belt may be the second belt end of a second belt other than the first belt.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2007-120784 (filed on May 1, 2007) which is expressly incorporated herein, by reference, in its entirety.

The invention claimed is:

1. A method for producing a joined belt by joining first and second belt ends, comprising:
preparing a press mold comprising a base portion, a wall portion that is provided on said base portion, and a movable member that faces said wall portion and that is provided above said base portion;
applying an adhesive on at least one of a first end face of said first belt end and a second end face of said second belt end, at least a part of said first end face that is diagonal to the belt width direction, or that is perpendicular to said belt width direction, said second belt end having a shape complementary to said first belt end;
butting said first end face to a second end face;
placing said butted portion on said base portion between said wall portion and said movable member; and
bonding said first and second end faces with said adhesive by moving said movable member to approach said wall portion to pinch and press said butted portion in said belt width direction between said movable member and said wall portion so that said first and second belt ends are joined.

2. A method according to claim 1, wherein said first belt end is provided with a tongue whose outer surface forms said first end face, and said first belt end is provided with a notch whose inner surface forms said second end face, said first and second end faces butted by inserting said tongue into said notch.

3. A method according to claim 2, wherein said tongue comprises a relatively narrow portion and a wider portion that is connected to the tip of said narrow portion.

4. A method according to claim 2, wherein the width of said tongue diminishes towards the tip of said tongue.

5. A method according to claim 4, wherein said tongue is of an isosceles triangle shape.

6. A method according to claim 2, wherein said tongue has a rectangular shape.

7. A method according to claim 2, wherein a plate portion contacts the top surface of said butted portion so as to prevent said tongue from separating from the inside of said notch.

8. A method according to claim 7, wherein said plate portion presses said butted portion so that said butted portion is not plastically deformed by compression.

9. A method according to claim 1, wherein said butted portion is heated across the belt thickness while said butted portion is pressed in said belt width direction.

10. A method according to claim 1, wherein said butted portion is pressed in the belt thickness direction while said butted portion is pressed in said belt width direction.

11. A method according to claim 1, wherein said first belt end is one end of a belt, said second belt end is the other end of said belt, and said joined belt is an endless belt.

12. A method according to claim 1, wherein said first and second belt ends are ends of a belt that has a tension member of a thermoplastic resin layer.

13. A method according to claim 12, wherein said tension member is an oriented polyamide film.

14. A method according to claim 1, wherein said first and second belt ends are joined by fusion-less bonding.

15. A method according to claim 14, wherein said adhesive is thermosetting adhesive, and said first and second end faces are bonded together with said thermosetting adhesive without fusion, by heating said butted portion.

16. A method according to claim 1, wherein said first and second belt ends are joined together without thinning said first and second belt ends by a pressure applied in a belt thickness direction.

17. A method according to claim 1, wherein said movable member moves together with a screw that is connected to said movable member, by tightening or loosening said screw in said belt width direction.

18. A method according to claim 1, wherein said butted portion is not pressed in the belt thickness direction while said butted portion is pressed in said belt width direction.

19. A method according to claim 1, wherein, while said butted portion is pressed in said belt width direction, a plate portion contacts a top surface of said butted portion and presses said butted portion so that said butted portion is not plastically deformed by compression.

20. A method according to claim 1, wherein said bonding comprises:
moving said movable member using a screw to a position where said butted portion is held between said movable member and said wall portion;
then further tightening the screw to pinch and press said butted portion at a pressure in said belt width direction between said movable member and said wall portion; and
maintaining the pressure until said adhesive is cured or solidified.

* * * * *